(12) United States Patent
Hirai

(10) Patent No.: US 6,598,642 B1
(45) Date of Patent: Jul. 29, 2003

(54) PNEUMATIC TIRE

(75) Inventor: Nobuyuki Hirai, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/661,432

(22) Filed: Sep. 13, 2000

(30) Foreign Application Priority Data

Sep. 30, 1999 (JP) ............................................ 11-278676

(51) Int. Cl.⁷ .......................... B60C 15/00; B60C 15/06
(52) U.S. Cl. ...................... 152/539; 152/540; 152/541; 152/550; 152/555
(58) Field of Search ................................ 152/539, 540, 152/555, 550, 543, 541, 542

(56) References Cited

U.S. PATENT DOCUMENTS

| | | | | |
|---|---|---|---|---|
| 2,966,933 A | * | 1/1961 | Boussu | 152/540 |
| 3,044,523 A | * | 7/1962 | Drakeford | 152/543 |
| 3,111,976 A | * | 11/1963 | Delobelle | 152/541 |
| 5,660,656 A | * | 8/1997 | Herbelleauu | 152/547 |
| 6,328,084 B1 | * | 12/2001 | Caretta et al. | 152/539 |

FOREIGN PATENT DOCUMENTS

| | | |
|---|---|---|
| EP | 0 582 196 A1 | 2/1994 |
| FR | 2.055.988 | 5/1971 |
| JP | 06143949 | * 5/1994 |
| JP | 08091026 | * 4/1996 |
| WO | WO 99/25572 | 5/1999 |

* cited by examiner

Primary Examiner—Michael W. Ball
Assistant Examiner—Justin Fischer
(74) Attorney, Agent, or Firm—Oliff & Berridge, PLC

(57) ABSTRACT

A pneumatic tire has such a bead portion structure that at least two bead wire structural bodies, each being obtained by spirally winding a bead wire(s) so as to continuously extend in a circumferential direction, are disposed in a bead portion so as to sandwich a carcass ply or enclose with the carcass ply, in which an outer end of at least one of the bead wire structural bodies in a radial direction is located on a position corresponding to a rim line or outward therefrom.

10 Claims, 3 Drawing Sheets

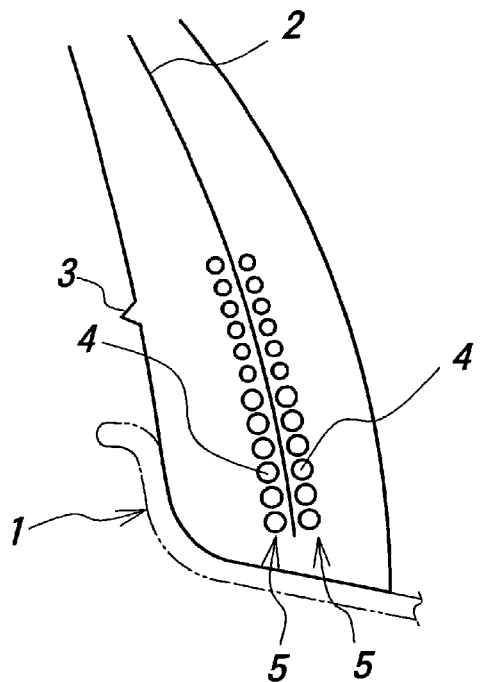
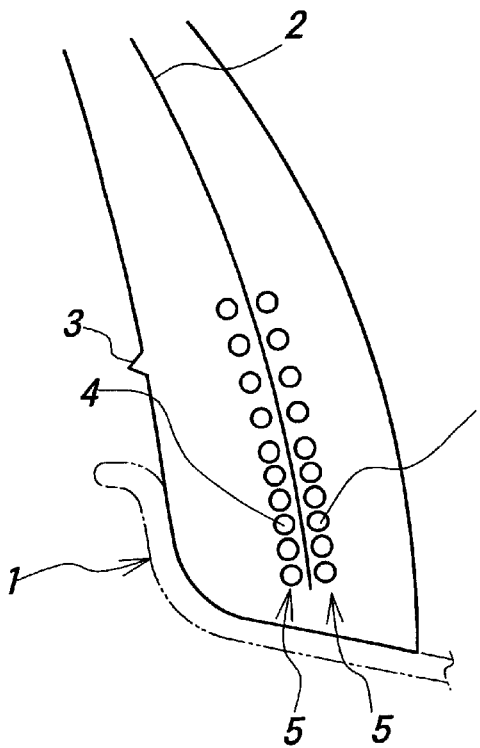
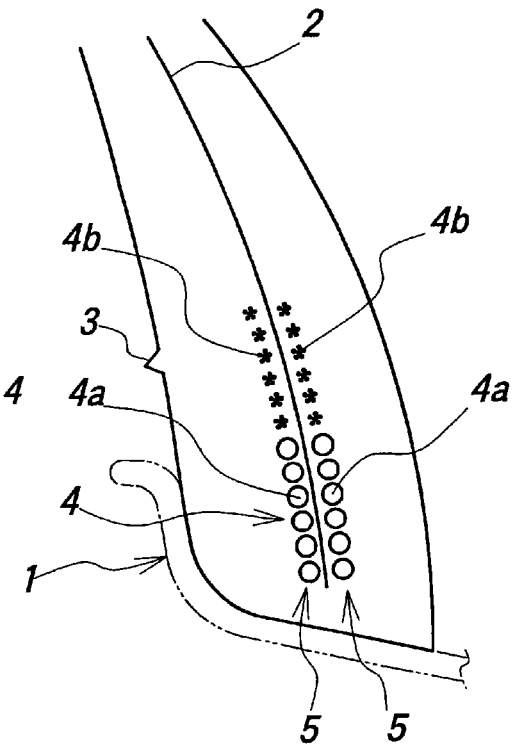

PNEUMATIC TIRE

BACKGROUND OF THE INVENTION

1. Field of the Invention

This invention relates to a pneumatic tire, and more particularly to an improvement of a bead portion structure in such a pneumatic tire which facilitates the increase and tuning of rigidity required in the bead portion and hence the tire itself and simultaneously establishes the steering stability and the ride comfort in a high level.

2. Description of Related Art

Heretofore, it has widely been conducted to embed an additional reinforcing member such as wire insert, flipper or the like in the bead portion for the increase and tuning of the rigidity in the bead portion of the pneumatic tire.

However, when the rigidity of the bead portion is increased by such an additional reinforcing member, for example, a wire insert wherein the wire extends obliquely in a constant direction crossing with a circumferential line segment viewing at a side face of the tire, the longitudinal rigidity of the bead portion in the tire is increased in addition to the rigidity in front and back directions, so that the steering stability is improved but the ride comfort is largely degraded.

SUMMARY OF THE INVENTION

It is, therefore, an object of the invention to solve the aforementioned problems of the conventional technique and to provide a pneumatic tire capable of simultaneously establishing the steering stability and ride comfort in a higher level by adequately selecting a winding form of a bead wire, which develops to fix an end portion of a carcass ply and adhere the bead portion of the tire to a rim sheet and the like, to simply and easily increase or decrease the rigidity required in the bead portion as being expected without using the additional reinforcing member such as wire insert, flipper or the like.

According to the invention, there is the provision of a pneumatic tire having a bead portion structure that at least two bead wire structural bodies, each being obtained by spirally winding a bead wire(s) so as to continuously extend in a circumferential direction, are disposed in a bead portion so as to sandwich a carcass ply or enclose with the carcass ply, in which an outer end of at least one of the bead wire structural bodies in a radial direction is located on a position corresponding to a rim line or outward therefrom.

According to such a bead portion structure in the tire, the bead wire is spirally wound up to the position corresponding to the rim line or outward therefrom in the radial direction of the tire, whereby the rigidity of the bead portion and hence the tire in front and back directions can be increased to advantageously improve the steering stability.

Furthermore, the spirally wound bead wire continuously extends in the circumferential direction and has no component extending in a direction crossing with a circumferential line segment as in the aforementioned wire insert, so that the increase of longitudinal rigidity can effectively be prevented with the increase of the rigidity in the front and back directions of the tire to ensure an excellent ride comfort.

In a preferable embodiment of the invention, the outer end of at least one of the bead wire structural bodies is positioned between the position corresponding to the rim line and a position of a maximum tire width.

According to this embodiment, the rigidity required in the tire or rigidity in the front and back directions is sufficiently increased and also the increase of the longitudinal rigidity can advantageously be controlled. In other words, if the outer end of the bead wire structural body in the radial direction is located over the maximum tire width position, the rigidity of a sidewall portion is increased and hence the longitudinal rigidity of the tire is too increased to degrade the ride comfort.

In another preferable embodiment of the invention, the rigidity in a lateral direction of the tire is changed between the mutual bead wire structural bodies located at inside and outside in the widthwise direction of the tire. Thus, the rigidity of the tire in the front and back directions can easily and properly be tuned in accordance with the required performances without excessively reinforcing the bead portion, whereby the reductions of tire weight and cost can be realized.

For instance, when the rigidity to lateral input directing inward in the widthwise direction is made high and the rigidity to lateral input directing outward in the widthwise direction is made low to make stress created in the deformation of the bead portion outward in the widthwise direction of the tire small and inversely make stress created in the deformation inward in the widthwise direction large, longitudinal spring constant in the riding over projection or the like so as to deform both bead portions outward in the widthwise direction can be controlled to a small value to ensure the excellent ride comfort.

On the other hand, in the cornering or the like so as to deform one of the bead portion inward and the other bead portion outward in the widthwise direction, the excellent steering stability can be ensured by the high rigidity of the bead portion to the inward deformation.

On the contrary, when the rigidity to lateral input directing inward in the widthwise direction is made low and the rigidity to lateral input directing outward in the widthwise direction is made high, the lateral rigidity of the tire can advantageously be controlled to more improve the steering stability. In this case, the longitudinal rigidity of the tire is also increased in the riding over the projection or the like to deny the degradation of the ride comfort, so that the adoption of this structure is useful when the improvement of the steering stability is particularly important.

In order to simply provide the required rigidity difference, it is favorable that the change in the rigidity of the bead wire structural body in the lateral direction of the tire is caused by at least one means applied to each bead portion between the mutual bead wire structural bodies located at inside and outside in the widthwise direction of the tire, which is selected from means for changing a diameter of the bead wire, means for changing an end count of bead wire in the bead wire structural body, means for changing the outer end position of the bead wire structural body in the radial direction and means for changing the construction of the bead wire, for example, using a combination of single wire and cable of twisted wires.

In the other preferable embodiment of the invention, the rigidity of each bead wire structural body in the longitudinal direction of the tire is changed in the radial direction. More particularly, the rigidity is made smaller in the outer portion of the bead wire structural body in the radial direction.

According to this embodiment, the rigidity of each of two or more bead wire structural bodies is changed together in the radial direction of the tire, whereby the balance between the rigidity in the front and back directions and the longitudinal rigidity in the tire can be controlled in a higher level and hence the high steering stability can be ensured while realizing the excellent ride comfort under the more effective control of the longitudinal rigidity.

And also, the sudden change of the rigidity in each direction ranging from the bead portion to the sidewall portion can advantageously be mitigated.

It is favorable that such a rigidity change is caused by at least one means selected from means for changing a bead wire diameter in the bead wire structural body in the radial direction, means for changing an arranging pitch of the bead wire and means for changing the construction of the bead wire.

BRIEF DESCRIPTION OF THE DRAWINGS

The invention will be described with reference to the accompanying drawings, wherein:

FIGS. 1 to 9 are diagrammatically section views of various embodiments in the main part of the pneumatic tire according to the invention, respectively.

DESCRIPTION OF PREFERRED EMBODIMENTS

Figure 1:
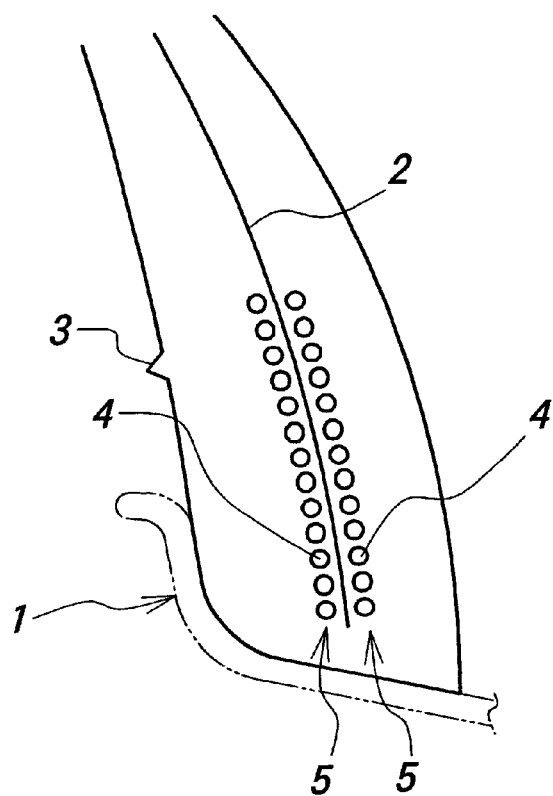

In FIG. 1 is sectionally shown a first embodiment of a main part in the pneumatic tire according to the invention, wherein numeral 1 is a bead portion, numeral 2 a carcass ply as a reinforcing member for the tire casing, and numeral 3 a rim line formed on an outer side surface of the bead portion 1.

Figure 2:
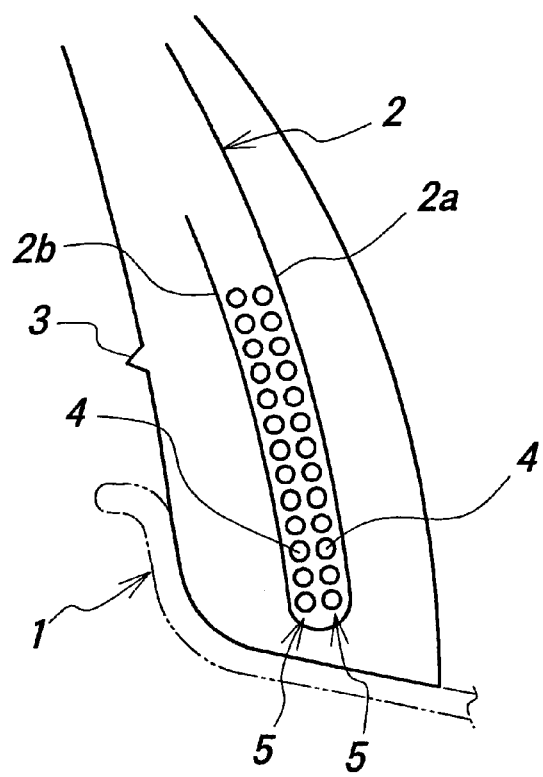

In the bead portion 1 of the tire, a bead wire structural body 5 is formed by spirally winding one or more bead wires 4, which continuously extend in a circumferential direction, for example, from an inside toward an outside in a radial direction. And also, such two bead wire structural bodies 5 are disposed in the bead portion 1 and are adjacent to each other at inside and outside in a widthwise direction of the tire. In this case, as shown in FIG. 1, an end portion of the carcass ply 2 is sandwiched between the two bead wire structural bodies 5, or as shown in FIG. 2, these bead wire structural bodies 5 are sandwiched between a main body 2a and turnup portion 2b of the carcass ply 2.

In the invention, an outer end of at least one of the bead wire structural bodies 5 in the radial direction, both outer ends of these bead wire structural bodies 5 in the illustrated embodiment are located in a position corresponding to the rim line 3 or outward therefrom. More preferably, the outer end is located between the position corresponding to the rim line 3 and a position of a maximum tire width.

Moreover, the position in the radial direction of the outer end of the bead wire structural body 5, rim line 3 or the like means a position in the radial direction at a use state of the tire or at a state that the tire assembled onto a rim is inflated under a given air pressure.

According to such a bead portion structure, each of these bead wire structural bodies 5 can sufficiently develop functions inherent thereto such as fixation of the end portion of the carcass ply, adhesion of the bead portion to the rim sheet and the like. In addition, the rigidity of the bead portion and hence the tire in front and back directions can be increased by winding the spirally extended bead wire 4 upward from the position corresponding to the rim line in the radial direction, if necessary, without requiring additional reinforcing members such as wire insert, flipper and the like to effectively improve the steering stability.

On the other hand, the bead wire 4 continuously extending in the circumferential direction of the tire hardly restrains the inward deformation of the tread portion in the radial direction and hence the inward deformation of the bead portion 1 and the sidewall portion in the widthwise direction of the tire, so that the longitudinal rigidity of the tire is maintained at a sufficiently small level to ensure the excellent ride comfort.

FIGS. 3 to 6 are partial section views of various embodiments of the pneumatic tire according to the invention, respectively, which correspond to various modified embodiments of FIG. 1. In these cases, the rigidity in the lateral direction of the tire is changed between the bead wire structural bodies 5 located at the inside and outside in the widthwise direction of the tire sandwiching the end portion of the carcass ply 2 therebetween.

Figure 3:
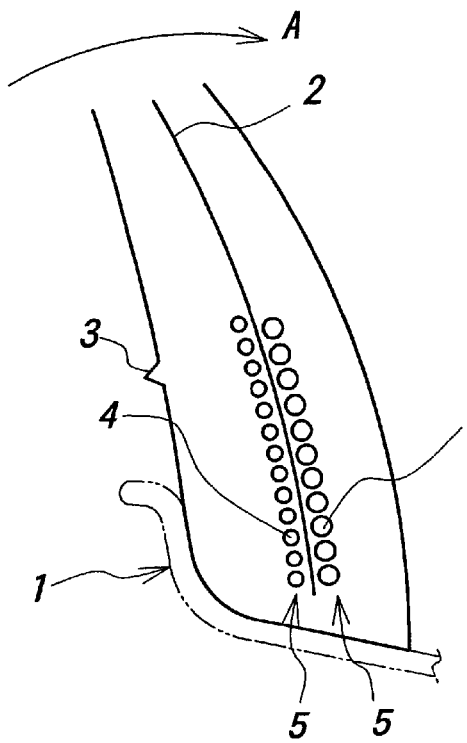
Figure 4:
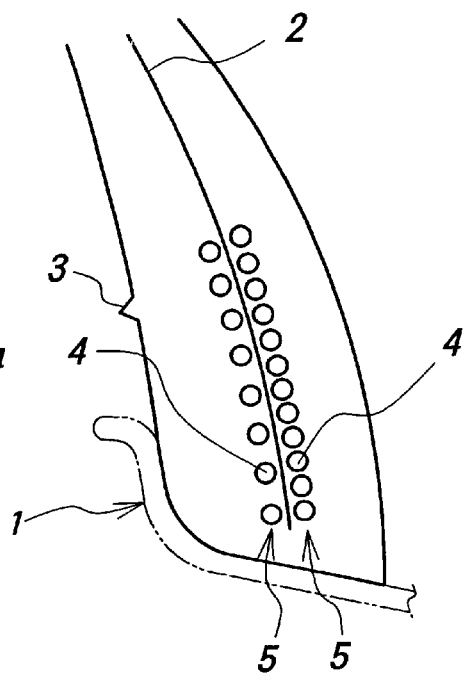
Figure 5:
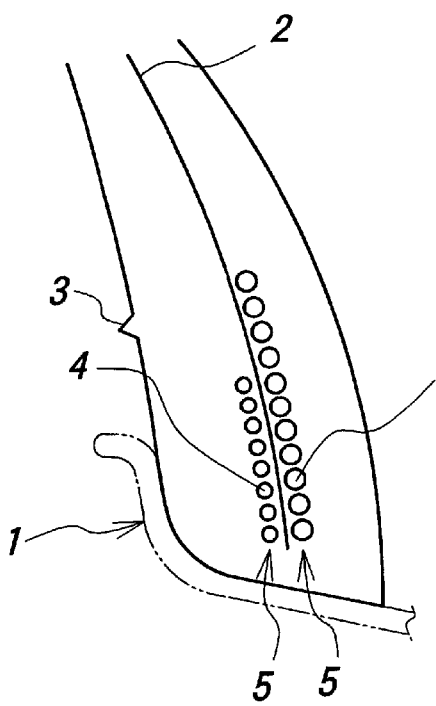
Figure 6:
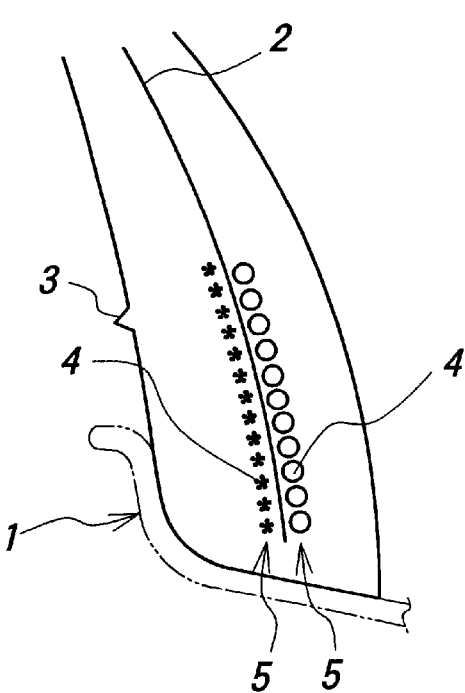

In order to make the bending rigidity of the bead portion 1 inward in the widthwise direction of the tire and hence the lateral rigidity larger than the bending rigidity outward in the widthwise direction as shown by an arrow A in FIG. 3, the diameter of the bead wire in the inner bead wire structural body 5 is made larger than that in the outer bead wire structural body 5 in FIG. 3, and the end count of bead wire in the inner bead wire structural body is made larger than that in the outer bead wire structural body in FIG. 4, and the position of the outer end of the inner bead wire structural body 5 in the radial direction is located outward from the position of the outer end of the outer bead wire structural body in FIG. 5, and the bead wire constituting the inner bead wire structural body is a single wire and the bead wire constituting the outer bead wire structural body is a cable of twisted wires in FIG. 6.

When the rigidity of each of the bead wire structural bodies 5 in the lateral direction of the tire is changed as mentioned above, the steering stability can advantageously be improved while ensuring the excellent ride comfort in the riding over the projection as previously mentioned without arranging the additional reinforcing member and hence increasing the tire weight, tire cost and the like accompanied therewith.

Moreover, when the relative construction of the bead wire structural bodies 5 located at inside and outside in the widthwise direction is made opposite to the above case, the rigidity in the front and back directions of the tire can be more effectively increased with somewhat sacrificing the longitudinal rigidity of the tire.

FIGS. 7 to 9 are partial section views of the other embodiments of the pneumatic tire according to the invention, respectively, which also correspond to various modified embodiments of FIG. 1. In these cases, the outer end of at least one bead wire structural body in the radial direction, both outer ends of the two bead wire structural bodies 5 in these embodiments are located at a position corresponding to the rim line 3 or outward therefrom, while the rigidity of each of the bead wire structural bodies 5 in the longitudinal direction of the tire is changed in the radial direction so that the rigidity in an outer portion in the radial direction is made smaller than that in an inner portion.

This is realized by making the diameter of the bead wire in each bead wire structural body 5 smaller in an outer portion in the radial direction than that in an inner portion in FIG. 7, or by making an arranging pitch of the bead wire 4 larger in an outer portion of the bead wire structural body in the radial direction than in an inner portion thereof in FIG. 8, or by using a single wire 4a in an inner portion of the bead wire structural body in the radial direction and a cable 4b of twisted wires in an outer portion thereof in FIG. 9.

According to such a bead portion structure, the rigidity in the front and back directions of the tire can be enhanced based on the selection of the position of the outer end of each bead wire structural body in the radial direction and the like to advantageously improve the steering stability. Furthermore, the more excellent ride comfort can be brought by reducing the longitudinal rigidity of the bead wire structural body and also the sudden change of the rigidity from the bead portion to the sidewall portion can be mitigated.

As mentioned above, according to the invention, the rigidity in the front and back directions of the tire is increased without using the additional reinforcing member, whereby the tire weight and the cost can be reduced to provide a higher steering stability, while the increase of the longitudinal rigidity of the tire can effectively be controlled to ensure the excellent ride comfort.

What is claimed is:

1. A pneumatic tire having a bead portion structure that at least two bead wire structural bodies, each being obtained by spirally winding a bead wire(s) so as to continuously extend in a circumferential direction, are disposed in a bead portion so as to sandwich a carcass ply or enclose with the carcass ply, in which an outer end of at least one of the bead wire structural bodies in a radial direction is located on a position corresponding to a rim line or outward therefrom, and, wherein a diameter of the bead wire in the bead wire structural body is changed in the radial direction of the tire.

2. A pneumatic tire having a bead portion structure that at least two bead wire structural bodies, each being obtained by spirally winding a bead wire(s) so as to continuously extend in a circumferential direction, are disposed in a bead portion so as to sandwich a carcass ply or enclose with the carcass ply, in which an outer end of at least one of the bead wire structural bodies in a radial direction is located on a position corresponding to a rim line or outward therefrom and a rigidity in a lateral direction of the tire is changed by changing a diameter of the bead wire between the mutual bead wire structural bodies located at inside and outside in a widthwise direction of the tire.

3. A pneumatic tire according to claim 2, wherein the outer end of at least one of the bead wire structural bodies in the radial direction is located between the position corresponding to the rim line and a position of a maximum tire width.

4. A pneumatic tire according to claim 2, wherein a position of the outer end of the bead wire structural body in the radial direction is changed between the mutual bead wire structural bodies located at inside and outside in the widthwise direction of the tire.

5. A pneumatic tire according to claim 2, wherein a construction of the bead wire is changed between the mutual bead wire structural bodies located at inside and outside in the widthwise direction of the tire.

6. A pneumatic tire having a bead portion structure that at least two bead wire structural bodies, each being obtained by spirally winding a bead wire(s) so as to continuously extend in a circumferential direction, are disposed in a bead portion so as to sandwich a carcass ply or enclose with the carcass ply, in which an outer end of at least one of the bead wire structural bodies in a radial direction is located on a position corresponding to a rim line or outward therefrom and a rigidity of the bead wire structural body in a longitudinal direction of the tire is changed in a radial direction of the tire by changing at least one of, a material used, and, a diameter of a bead wire, between one of the bead wire structural bodies and another bead wire structural body.

7. A pneumatic tire according to claim 6, wherein the rigidity in the longitudinal direction of the tire is made smaller in an outer portion of at least one of the bead wire structural bodies than the other portion thereof in the radial direction of the tire.

8. A pneumatic tire according to claim 6, wherein a diameter of the bead wire in at least one of the bead wire structural bodies is changed in the radial direction of the tire.

9. A pneumatic tire according to claim 6, wherein an arranging pitch of the bead wire in at least one of the bead wire structural bodies is changed in the radial direction of the tire.

10. A pneumatic tire according to claim 6, wherein a construction of the bead wire in at least one of the bead wire structural bodies is changed in the radial direction of the tire.

* * * * *